United States Patent [19]

Wiebe

[11] Patent Number: 4,998,693

[45] Date of Patent: Mar. 12, 1991

[54] SUPPLY HOSE SUPPORT ARRANGEMENT FOR CAR WASH

[76] Inventor: Jacob R. Wiebe, 60 Heaton Avenue, Winnipeg, Manitoba, Canada, R3B 3E3

[21] Appl. No.: 326,005

[22] Filed: Mar. 20, 1989

[51] Int. Cl.$^5$ .............................................. B05B 15/08
[52] U.S. Cl. ....:................................ 248/75; 248/278; 239/588; 239/282; 239/195
[58] Field of Search .................... 248/75, 89, 90, 91, 248/92, 93, 80, 81, 560, 579, 276, 278, 302, 280.1; 137/615; 239/587, 588, 282, 283, 195, 197

[56]     References Cited
        U.S. PATENT DOCUMENTS

| 2,905,194 | 9/1959 | Smith | 239/197 |
| 2,948,479 | 8/1960 | Graceman | 239/282 |
| 3,265,087 | 8/1966 | Livingston | 239/588 |
| 3,422,827 | 1/1969 | McCulloch | 239/588 |
| 4,456,177 | 6/1984 | Johnson | 239/282 |
| 4,575,005 | 3/1986 | Wiebe . | |

FOREIGN PATENT DOCUMENTS 1217991  2/1987  Canada .
604230   4/1926  France .

Primary Examiner—Ramon O. Ramirez
Assistant Examiner—Robert A. Olson
Attorney, Agent, or Firm—Adrian D. Battison; Stanley G. Ade; Murray E. Thrift

[57]     ABSTRACT

A boom for the supply hose of a fluid used in a car wash is rotatable around a vertical axis in a horizontal plane. Flexibilty of the boom out of the horizontal plane is provided by a spring wire having a loop turned through more than 360° partway along the length of the wire with a leveller device engaging upper edges of inner and outer portions of the wire on either side of the loop and an underside of the inner turns of the loop so as to hold down the outer portion of the wire and locate the boom in the required horizontal plane. Rotation in one embodiment is provided by a vertical portion at the inner end of the wire mounted within a suitable bearing and provided with a coil spring acting to bias the boom to a required angular orientation around the vertical portion of the wire. In a second embodiment for use with 360° rotation of the boom there is provided a locating device comprising a heart-shaped cam and a spring biased roller which acts to bias the cam and thus the rotatable hub to the cusp of the heart-shape.

22 Claims, 3 Drawing Sheets

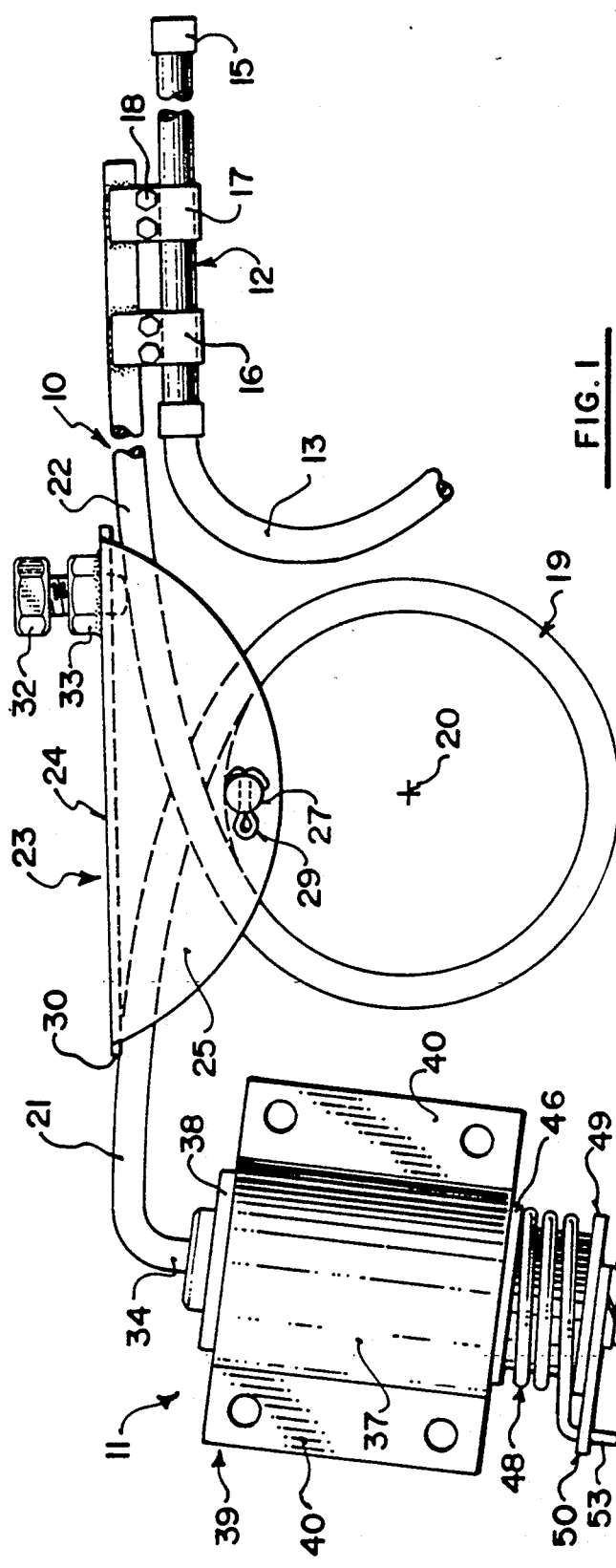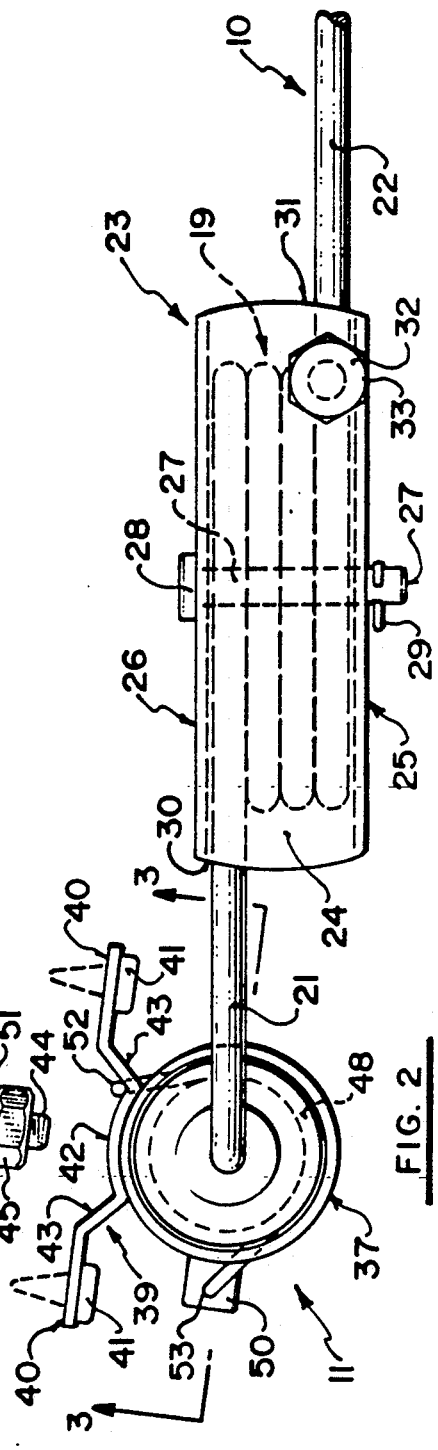
FIG. 1
FIG. 2

SUPPLY HOSE SUPPORT ARRANGEMENT FOR CAR WASH

BACKGROUND OF THE INVENTION

This invention relates to a supply hose arrangement for a car wash.

In one type of car wash, the washing fluid is supplied through a flexible hose with the flexible hose supported by a boom rotatable about a vertical axis and extending generally horizontally from a support member for rotation in a horizontal plane.

In older types of boom arrangement there is provided a substantially rigid boom generally in the form of a tube which is then supported upon a complex and heavy support member at the vertical axis generally including a spring assembly which allows the boom to be pulled downwardly from the horizontal axis. U.S. Pat. No. 4,575,005 (Jacob R. Wiebe) and the corresponding Canadian Patent No. 1,217,991 disclose an arrangement in which the boom comprises a spring wire mounted for rotation about the vertical axis with the spring wire including at least one loop through 360° arranged such that the wire can bend in a vertical bending plane down from the horizontal plane about an axis defined by the loop, the loop lying substantially in the vertical bending plane of the wire so that the bending of the wire in the vertical bending plane causes torsioning of the loop. Booms of this type can be used as ceiling mounted booms which are rotatable around the full 360° of the horizontal plane in which case a swiveling coupling is necessary between the hose and a supply conduit at the central support. In other cases a boom of this type can be used as a side mounted boom rotatable only through 180° which is then generally mounted on a side wall of a car wash stall.

Booms of this type have been very successful and have become very popular in comparison with the old heavy type tubular boom in view of the lightness of the new boom and the consequential reduction in parts and price.

One problem which arises with booms of this type is that of accommodating different types or weights of hose arrangement since heavier hoses will tend to bow the spring wire downwardly from the horizontal plane. If the wire is biased upwardly from the horizontal plane then lighter hoses will not draw it down sufficiently to pull it back into the horizontal plane.

A further problem which arises with booms of this type is that of providing a park arrangement so that the boom is properly positioned at a predetermined angular orientation about the vertical axis when it is released so that it returns each time to the park position from which it can be easily retrieved by the operator.

SUMMARY OF THE INVENTION

According to the first aspect of the invention, therefore, there is provided a boom for a supply hose of a car wash comprising a support hub member including bearing means for defining a vertical rotation axis for the boom, an integral spring wire having one inner end mounted on said support hub member for rotation about the vertical axis and an outer portion at the second outer end thereof extending outwardly from the hub member in a substantially horizontal direction for rotation in a substantially horizontal plane, hose support means attached to the outer portion of the spring wire so as to support said supply hose outwardly of the support hub member for rotation with the spring wire about said vertical axis, said spring wire including at least one loop therein rotated through at least 360° arranged such that the wire can bend in a vertical bending plane down from the horizontal plane about an axis defined by the loop, said loop lying substantially in the vertical bending plane of the wire whereby bending of the wire in the vertical bending plane causes torsioning of the loop, said loop being contiguously connected with an inner tangentially extending portion extending from said loop to said inner end and an outer tangentially extending from said loop to said outer end, said loop being formed such that in a relaxed condition of the loop the outer end extends upwardly from the horizontal plane, and a leveller device for restraining the outer end against upward movement comprising a member mounted on the spring wire at the loop and arranged to engage upper edges of the inner and outer portions and the loop.

According to the second aspect of the invention, therefore, there is provided a boom for a supply hose of a car wash comprising a support hub member including bearing means for defining a vertical rotation axis for the boom, an integral spring wire having one inner end mounted on said support hub member for rotation about the vertical axis and an outer portion at the second outer end thereof extending outwardly from the hub member in a substantially horizontal direction for rotation in a substantially horizontal plane, hose support means attached to the outer portion of the spring wire so as to support said supply hose outwardly of the support hub member for rotation with the spring wire about said vertical axis, said spring wire including at least one loop therein rotated through at least 360° arranged such that the wire can bend in a vertical bending plane down from the horizontal plane about an axis defined by the loop, said loop lying substantially in the vertical bending plane of the wire whereby bending of the wire in the vertical bending plane causes torsioning of the loop, the inner end of the spring wire including a portion thereof turned right angles thereto so as to extend along said vertical axis, the support hub member including bearing means surrounding said vertical portion of the wire and a bracket for attachment to a fixed surface, a coil spring coiled around the vertical portion and having one end thereof attached to the bracket and the other end thereof arranged to cause rotation of the wire about the vertical axis so as to tend to move the wire to a specific angular orientation around the vertical axis in a park position thereof, and means for adjusting the angular position of one end of the spring relative to the other end of the spring so as to adjust the spring force tending to turn the wire.

According to the third aspect of the invention, therefore, there is provided a boom for a supply hose of a car wash comprising a support hub member including bearing means for defining a vertical rotation axis for the boom, an integral spring wire having one inner end mounted on said support hub member for rotation about the vertical axis and an outer portion at the second outer end thereof extending outwardly from the hub member in a substantially horizontal direction for rotation in a substantially horizontal plane, hose support means attached to the outer portion of the spring wire so as to support said supply hose outwardly of the support hub member for rotation with the spring wire about said vertical axis, said spring wire including at least one loop therein rotated through at least 360° arranged such that the wire can bend in a vertical bending plane down from the horizontal plane about an axis defined by the loop, said loop lying substantially in the vertical bending plane of the wire whereby bending of the wire in the vertical bending plane causes torsioning of the loop, the support hub member comprising a fixed hub portion mounted on a bracket for attachment to a fixed surface, a rotatable hub portion rotatable relative to the fixed hub portion on bearing means, the rotatable hub portion including attachment means mounting said inner end of said spring wire thereon for rotation about the fixed hub portion through 360° surrounding the fixed hub portion, and means biasing the rotatable hub portion to a specific angular orientation thereof around the fixed hub portion to define a park position of the spring wire comprising a cam member mounted on said rotatable hub member and a cam follower, the follower being spring biased against the cam member and the cam member being shaped to define said park position while allowing rotation of said cam member relative to said cam follower through 360°.

According to the fourth aspect of the invention, there is provided a boom for a supply hose of a car wash comprising a support hub member including bearing means for defining a vertical rotation axis for the boom, an integral spring wire having one inner end mounted on said support hub member for rotation about the vertical axis and an outer portion at the second outer end thereof extending outwardly from the hub member in a substantially horizontal direction for rotation in a substantially horizontal plane, hose support means attached to the outer portion of the spring wire so as to support said supply hose outwardly of the support hub member for rotation with the spring wire about said vertical axis, said spring wire including at least one loop therein rotated through at least 360° arranged such that the wire can bend in a vertical bending plane down from the horizontal plane about an axis defined by the loop, said loop lying substantially in the vertical bending plane of the wire whereby bending of the wire in the vertical bending plane causes tortioning of the loop, wherein the hose support means includes an elongate pipe, the pipe having at an inlet end a first connector for receiving a cleaning liquid, a second connector for receiving compressed air, and wherein the interior of the pipe is substantially filled with an elongate material defining a multitude of interstices along the length of the material for generating foam from the liquid and air supply.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevational view of a boom for a supply hose of a car wash according to the invention.

FIG. 2 is a top plan view of the boom of FIG. 1.

DETAILED DESCRIPTION

One example of a boom on which this invention is based is described in the above mentioned U.S. Pat. No. 4,575,005 and corresponding Canadian Patent No. 1,217,991 to which reference is made.

Figure 3:
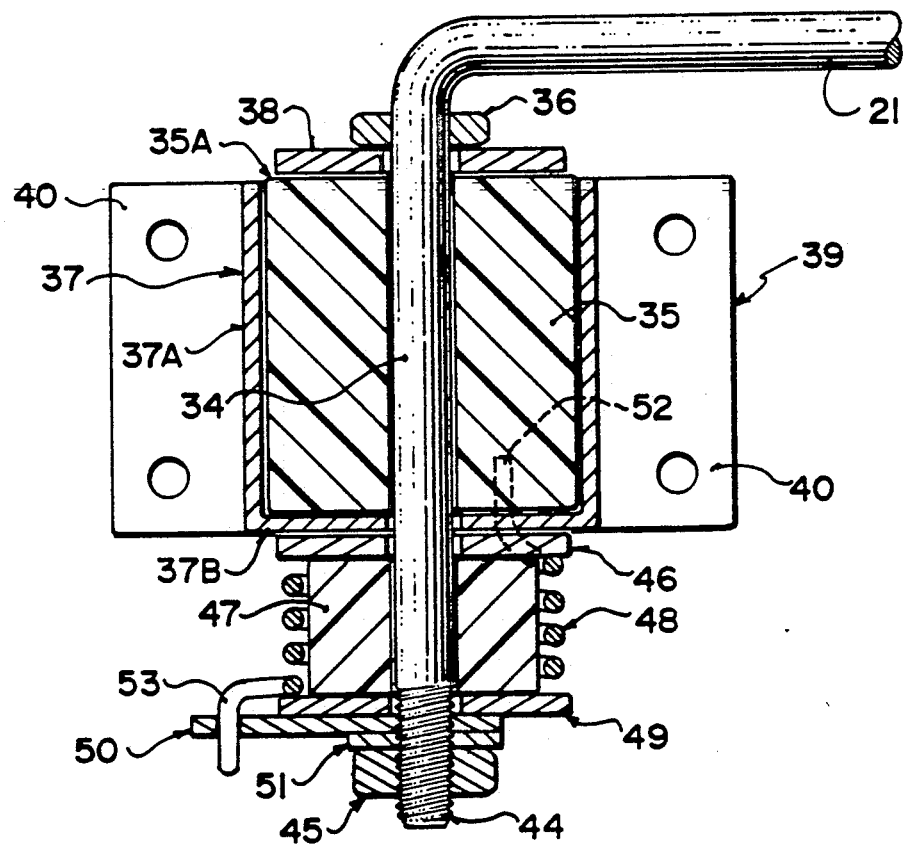
FIG. 3 is a cross sectional view along the lines 3—3 of FIG. 2.
Figure 4:
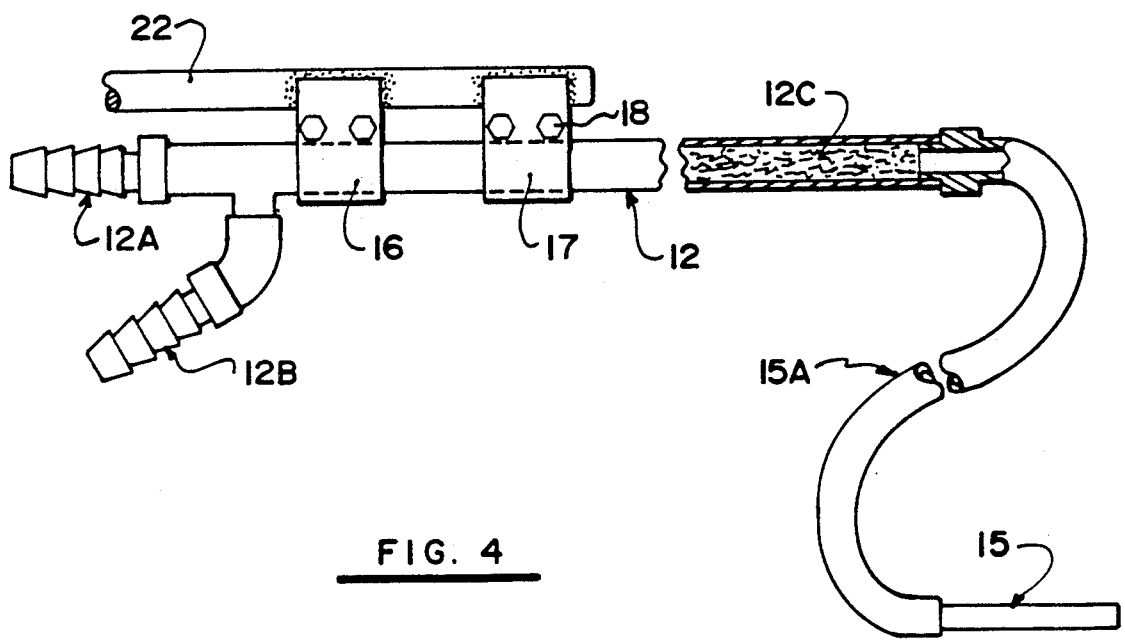
FIG. 4 is view of one part of the boom of FIG. 1 showing particularly the supply pipe and flexible hose.
Figure 5:
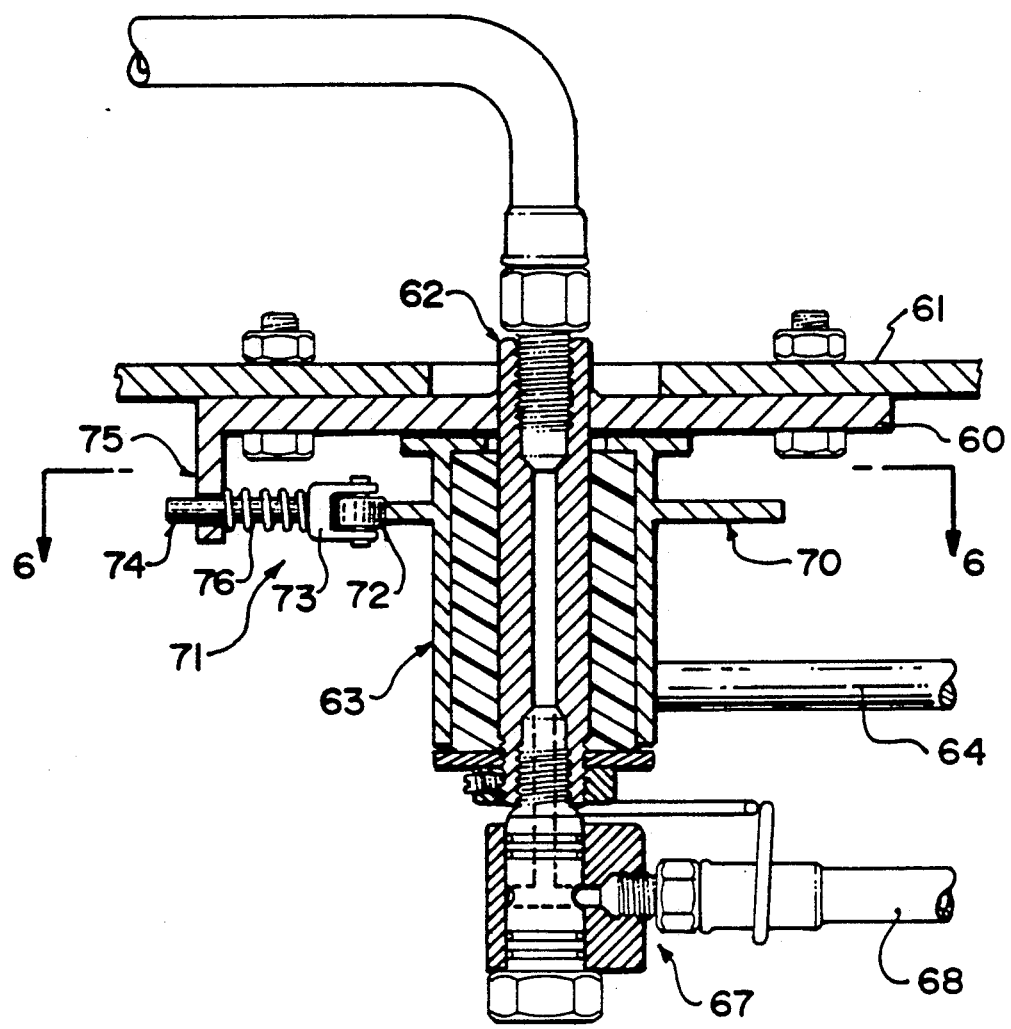
FIG. 5 is a vertical cross section through an alternative boom according to the invention.

In FIGS. 4 and 5 is illustrated a central mounted boom of the type shown in the above patent and in FIGS. 1, 2 and 3 is shown an alternative type of boom which is of the side mount type which is intended to rotate only through an angle of the order of 180° generally to be mounted on a side wall of a car wash booth.

Turning firstly therefore to FIGS. 1, 2 and 3, the boom comprises a spring wire generally indicated at 10 which is mounted at an inner end on a mounting bracket and central support hub generally indicated at 11 and includes attached to the outer end a supply duct 12 in the form of a rigid pipe which extends outwardly from the outer end of the spring wire and carries fluid from a flexible supply line 13 to a dispensing head schematically indicated at 15. The dispensing head 15 can include a flexible hanging hose 15A (FIG. 4) which is attached to the pipe 12 by a suitable coupling and which can be grasped by an operator and moved to the desired location. The details of the hose and the dispensing nozzle are shown only schematically since they are not part of the present invention.

The rigid pipe 12 is attached to the outer end of the spring wire 10 by a pair of brackets 16 and 17 which are welded to the wire and which include screws 18 by which the rigid duct 12 can be clamped and released for adjustment longitudinally of the end of the spring wire.

The spring wire as shown in FIGS. 1 and 2 is rotated at a point intermediate its ends to form a loop 19 having a plurality of turns. The loop allows the spring wire to be flexed in a downward direction by torsioning of the loop 19. Thus the loop 19 includes at least 360° and is arranged such that the wire can bend in a vertical bending plane down from the horizontal plane about an axis 20 defined centrally of the loop with the loop lying substantially in the vertical bending plane of the wire so the bending of the wire in that vertical bending plane causes the torsioning of the loop. Thus the stress of the bending is taken up by the torsioning of the loop and is not applied to straight portions of the wire which could cause deformation beyond the elastic limit. The bending of the wire into the loop is carried out so that in a relaxed position of the wire, the wire turns through slightly less than a whole number of turns so that with the inner end portion indicated at 21 of the wire in a horizontal orientation, an outer end portion 22 of the wire to which the duct 12 is attached extends upwardly slightly out of the horizontal plane of the inner end portion 21.

In order to maintain the outer portion 22 of the wire at a required position, there is provided a leveller device generally indicated at 23. It will be appreciated that the weight of the duct 12 and dispensing device 15 is applied to the outer end of the wire 22. Depending upon the installation and the material to be supplied, the weight of this duct and associated equipment can vary considerably so that it is not possible to preload the spring wire 10 to hold the duct 12 at a required height since that height will vary in dependence upon the weight. This problem is therefore overcome by providing a slightly greater preloading of the wire so that it will tend to hold the heaviest weight of equipment expected to be used in a slightly raised condition from the required height by virtue of the angular extent of the loop 19. The leveller device then acts to hold the outer end portion 22 at a required height by slightly tensioning the loop and by pressing downwardly on the outer portion 22 to hold it at the required position.

The leveller device 23 is of a simple construction and is independant of the support hub 11 acting only upon the wire itself thus enabling the wire to freely rotate around the support hub and avoiding any extra stress on the support hub. Thus the leveller device comprises a channel member having a base 24 and a pair of sides 25 and 26 at right angles to the base and extending downwardly therefrom. The width of the base 24 is arranged so that it spans the width of the loop 19 as best shown in FIG. 2 so that the sides 25 and 26 extend downwardly along the sides of the loop in a closely confining arrangement. A pin 27 extends across the sides 25 and 26 having a head 28 against one side and a latching pin 29 against the other side holding the pin spanning the two sides of the channel member. The length of the base is such that one end 30 engages the upper edge of the inner portion 21 of the wire and the other end 31 engages the upper edge of the outer portion 22 of the wire. The leveller device operates by the base 24 pressing against the upper edges of the inner and outer portions of the wire and the pin 27 engaging against the underside of the upper wraps of the loop to define three points of contact. The engagement with the inner portion of the wire and the underside of the loop acts to confine the leveller device to a required position and the engagement with the outer portion of the wire acts to hold down that outer portion to a required position. The action of the leveller device can be adjusted by a screw threaded pin 32 which passes through an opening in the base 24 reinforced by a collar 33 so that a lower end of the pin 32 can press against the upper edge of the outer portion 22. The height of the lower end can thus be adjusted by screwing the pin through the collar 33.

Thus the leveller device is entirely independent of the support hub and can be used to adjust the position of the outer end 22 and thus the dispensing device 15 to hold it in a required horizontal plane of rotation around the support hub 11.

A rotation axis for the boom is defined by an end 34 of the wire which is turned at right angles to the inner end portion 21 as best shown in FIG. 3. The vertical portion 34 caries a fixed abutment of ferrule 36 and passes through a central bore of a nylon bearing 35 which allows the portion 34 to rotate about the vertical axis along its length. An upper edge 35A of the nylon bearing 35 engages against a flat washer 38 which acts as a thrust bearing holding the ferrule 36 and turns the upper portion 21 at a required height above the bearing 35. The bearing is housed within a cylindrical container or cup 37 having a cylindrical wall 37A and a bottom wall 37B with a central opening through which the lower end of the portion 34 of the wire extends. The cylindrical housing 37 as best shown in FIG. 2 is attached to a mounting bracket 39 which has a pair of flat plates 40 for attachment by screws 41 to a suitable vertical surface together with a central band 42 which is curved to follow the outer shape of the cylindrical wall 37A and is raised away from the surface by legs 43 to define a hollow area between the surface and the inner side of the band 42.

A lower end of the vertical portion 34 of the wire is threaded as indicated at 44. A locking nut 45 is screwed onto the lower end so as to clamp the end pieces against the underface of the end wall 37B. The end pieces comprise a flat washer 46, a spacer ring 47 again of a nylon material, a coil spring 48, a flat washer 49, a tension arm 50 and a spring or lock washer 51.

The coil spring 48 has an upper end 52 and a lower end 53 which are bent outwardly. The upper end 52 is then bent upwardly as shown best in FIG. 3 and extends outwardly behind the bracket 39 so as to be retained in the hollow area behind the bracket thus angularly confining the end of the spring and preventing its rotation around the axis. The other end of the spring as indicated at 53 passes through a hole in the tension arm 50. The coil spring 48 is then tensioned so that it applies a force tending to turn the tension arm 50 around the axis. The tension arm 50 is attached to the threaded end of the vertical portion of the wire by an inner screw thread of a hole through the tension arm 50 so that the tension arm can be rotated or screwed onto the lower end and then locked in place by the clamping action of the locknut 45. In this way the angular position of the tension arm 50 around the lower end of the vertical portion 34 can be adjusted to adjust the amount of spring action of the coil spring 48 on the lower portion and thus on the boom tending to turn the boom to a required angular position or park position. The spring can be chosen so that at the park position there is little or no spring force remaining so that the boom is not aggressively impacted against the surface on which the bracket is mounted. The spring can be left or right handed so that it acts in a required direction for left or right hand parking. The spacer 47 acts to avoid the spring 48 collapsing inwardly and holds it in a required annular configuration.

Turning now to FIG. 4, the pipe 12 is shown in more detail attached by the bracket 16 and 17 to the outer portion of the wire. The pipe comprises an elongate rigid tubular pipe through which the material to be supplied to the head 15 passes. In the example shown in FIGS. 1 through 4, the device comprises a boom for supplying foam for an initial cleaning action on a vehicle. The pipe 12 is therefore manufactured of a type which automatically generates foam within the length of the pipe for supplying to the head 15.

Conventionally, a separate foaming unit is mounted on the wall or ceiling adjacent the boom for generating foam which is then merely transmitted through the pipe to the head 15. In the present case the pipe is of a special construction which enables it to generate foam without necessity for a separate foam unit. The device therefore comprises a first and a second inlet member 12A, 12B. Each of the inlet units includes a barb of conventional form onto which a flexible supply hose can be attached. The first connector 12A is arranged for attachment to a supply of a detergent/water mixture under pressure. The second connector 12B is arranged for connection to a supply of compressed air. The full length of the pipe contains a material indicated at 12C which defines the plurality of small openings or interstices between the material which cause the air and liquid to mix in a foaming action. The material is of the type comprising a knitted, rough, course nylon material which is conventionally used as a scrubbing abrasive. The knitted material is readily available as a tubular body generally of the order of four inches in width. The material is significantly courser than steel wool and is knitted from nylon or other suitable plastics material in strip form so that edges of these strips can stand out from the abrasive fabric so formed to act as abrading edges. This material can be collapsed into a thin rope by a twisting and compressing action so that its diameter is reduced to a diameter less than one inch so that it can be fed into the interior of the pipe. Once in the interior the resilience of the material causes it to expand leaving a plurality of openings along the length of the pipe. The openings themselves are relatively large in comparison with the conventionally employed steel wool material but in view of the large number of openings in the full length of the pipe, an effective foaming action occurs within the pipe so that the material escaping along the feed line 15A is fully foamed for effective cleaning action.

Figure 6:
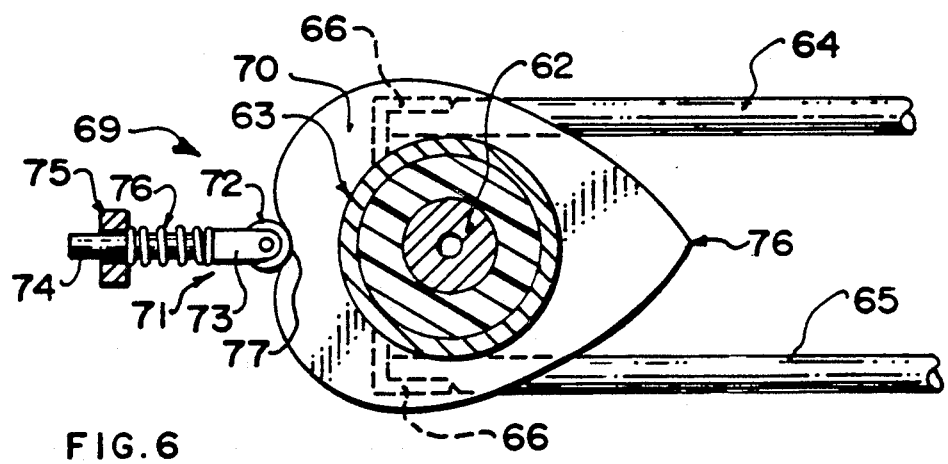
FIG. 6 is a cross sectional view along the lines 6—6 of FIG. 5.

Turning now to FIGS. 5 and 6 there is shown a central support hub structure of the type generally shown in the above mentioned U.S. Pat. which enables a full 360° rotation of the boom relative to a ceiling mounting bracket. As the device is generally as shown in the previous patent, full details will not be included here. It suffice to say that there is provided a basic mounting bracket 60 which is attached to a ceiling plate 61 and which carries a fixed central support shaft 62 upon which is mounted a rotatable hub portion 63. The hub portion 63 carries a pair of spring wires 64 and 65 of the shape described above and including the leveller mechanism 23 (not shown).

The spring wires 64 and 65 are mounted on the rotatable hub 63 by way of suitable support receptacles 66 which allow the wires to extend in the horizontal direction similar to the portion 21 of FIG. 1. A liquid supply mechanism is generally indicated at 67 for connecting to the flexible hose 68 but will not be described in detail here. In addition to the modification relative to the above patent of the mounting and configuration of the spring wires 64 and 65, there is a further modification relative to the above mentioned patent in the provision of a angular locating or park device indicated at 69. The park device includes a cam 70 fixed to the rotatable hub 63 for rotation therewith together with a spring mounted follower 71 including a roller 72, a clevis 73 and a shaft 74. The shaft is slidably supported within a bracket 75 carried upon the main bracket 60. A spring 76 biases the roller 72 into contact with the cam so as to provide a force on the cam surface. The cam is heart-shaped in plan view as shown in FIG. 5 with a maximum radial extension 76 and a minimum radial extension 77 at a cusp which acts to locate the cam with the cusp adjacent the roller 72.

Thus the rotatable hub 63 is free to rotate around the axis defined by the fixed shaft 62 with the sliding action of the rod 74 taking up the movement of the roller as it is engaged by the cam surface. However when the boom is released, the action of the roller on the cam surface tends to move the cam and thus the boom to the predetermined angular position defined by the cusp 77.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A boom for a supply hose of a car wash comprising a support hub member including bearing means for defining a vertical rotation axis for the boom, an integral spring wire having an inner end mounted on said support hub member for rotation about the vertical axis and an outer end portion extending outwardly from the hub member in a substantially horizontal direction for rotation in a substantially horizontal plane, hose support means attached to the outer portion of the spring wire so as to support said supply hose outwardly of the support hub member for rotation with the spring wire about said vertical axis, said spring wire including at least one loop therein rotated through at least 360° arranged such that the wire can bend in a vertical bending plane down from the horizontal plane about an axis defined by the loop, said loop lying substantially in the vertical bending plane of the wire whereby bending of the wire in the vertical bending plane causes torsioning of the loop, said loop being contiguously connected with an inner tangentially extending portion extending from said loop to said inner end and an outer tangentially extending portion extending from said loop to said outer portion, said loop being formed such that in a relaxed condition of the loop the outer end portion extends upwardly from the horizontal plane, and a leveller device for restraining the outer portion against upward movement comprising a member mounted on the spring wire at the loop arranged to engage upper edges of the inner and outer tangentially extending portions and the loop.

2. The invention according to claim 1 wherein the leveller device is free from engagement with the support hub member.

3. The invention according to claim 1 wherein the leveller device comprises a channel member defining a base surface and a pair of flanges extending from the base surface generally at right angles thereto, the base surface lying across the upper edges of the inner and outer portions so as to engage the upper edges and to hold down the outer portion, and a cross member extending between said flanges and engaging inside said loop.

4. The invention according to claim 1 wherein the leveller device includes an adjustable abutment member for engaging one of said inner and outer portions and said loop so as to adjust the height of the outer portion.

5. The invention according to claim 4 wherein the adjustable abutment member comprises a screw threaded member having a head engaging the upper edge of the outer portion for directly bearing on the upper edge and for adjusting the height of the outer portion.

6. The invention according to claim 1 wherein the inner end of the spring wire includes a portion thereof turned right angles thereto so as to extend along said vertical axis, said bearing means surrounding said vertical portion of the wire.

7. The invention according to claim 1 wherein the support hub member comprises a bracket for attachment to a fixed surface and wherein there is provided a coil spring coiled around the vertical axis and having one end thereof attached to the bracket and the other end thereof arranged to cause rotation of the wire about the vertical axis so as to tend to move the wire to a specific angular orientation around the vertical axis in a park position thereof.

8. The invention according to claim 7 including means for adjusting the angular position of one end of the spring relative to the other end of the spring so as to adjust the spring force tending to turn the wire.

9. The invention according to claim 8 wherein a lower end of the vertical portion of the wire is threaded and wherein the means for adjusting comprises a tension arm having a female screw thread for attachment onto the threaded portion of the vertical wire and a locknut member for locking the tension arm at a required predetermined angular orientation around the axis, the other end of the coil spring being attached to the tension arm to cause rotation of the vertical portion of the wire.

10. The invention according to claim 1 wherein an inner end of the spring wire includes an end thereof turned at right angles thereto so as to extend along the vertical axis and wherein the support hub member comprises a bracket for attachment to a fixed surface, said bearing means being mounted on the bracket for supporting the vertical portion of the wire and wherein there is provided a coil spring member surrounding the vertical portion of the wire and having one end attached to the bracket and an opposed end thereof attached to the vertical portion of the wire so as to tend to rotate the vertical portion of the wire about the vertical axis to a predetermined angular orientation at a park position.

11. The invention according to claim 1 wherein the support hub member comprises a fixed hub portion mounted on a bracket for attachment to a fixed surface, a rotatable hub portion rotatable relative to the fixed hub portion on said bearing means, the rotatable hub portion including attachment means mounting said inner end of said spring wire thereon for rotation about the fixed hub portion through 360° surrounding the fixed hub portion.

12. The invention according to claim 11 including means biasing the rotatable hub portion to a specific angular orientation thereof around the fixed hub portion to define a park position of the spring wire.

13. The invention according to claim 11 wherein the biasing means comprises a cam member mounted on said rotatable hub member and a cam follower, the roller being spring biased against the cam member and the cam member being shaped to define said park position while allowing rotation of said cam member relative to said cam follower through 360°.

14. The invention according to claim 13 wherein the cam member is heart-shaped.

15. The invention according to claim 1 wherein the hose support means includes an elongate pipe, the pipe having at an inlet end a first connector for receiving a cleaning liquid, a second connector for receiving compressed air, and wherein the interior of the pipe is substantially filled with an elongate material defining a multitude of interstices along the length of the material for generating foam from the liquid and air supply.

16. The invention according to claim 15 wherein the elongate material comprises a knitted plastics material.

17. A boom for a supply hose of a car wash comprising a support hub member including bearing means for defining a vertical rotation axis for the boom, an integral spring wire having an inner end mounted on said support hub member for rotation about the vertical axis and an outer end portion extending outwardly from the hub member in a substantially horizontal direction for rotation in a substantially horizontal plane, hose support means attached to the outer portion of the spring wire so as to support said supply hose outwardly of the support hub member for rotation with the spring wire about said vertical axis, said spring wire including at least one loop therein rotated through at least 360° arranged such that the wire can bend in a vertical bending plane down from the horizontal plane about an axis defined by the loop, said loop lying substantially in the vertical bending plane of the wire whereby bending of the wire in the vertical bending plane causes torsioning of the loop, the inner end of the spring wire including a portion thereof turned right angles thereto so as to extend along said vertical axis, said bearing means surrounding said vertical portion of the wire, a bracket for attachment to a fixed surface, a coil spring coiled around the vertical axis and having one end thereof attached to the bracket and the other end thereof arranged to cause rotation of the wire about the vertical axis so as to tend to move the wire to a specific angular orientation around the vertical axis in a park position thereof, and means for adjusting the angular position of one end of the spring relative to the other end of the spring so as to adjust the spring force tending to turn the wire.

18. The invention according to claim 17 wherein a lower end of the vertical portion of the wire is threaded and wherein there is provided a tension arm having a female screw thread for attachment onto the threaded portion of the vertical wire and a locknut member for locking the tension arm at a required angular orientation around the axis, the other end of the coil spring being attached to the tension arm to cause rotation of the vertical portion of the wire.

19. A boom for a supply hose of a car wash comprising a support hub member including bearing means for defining a vertical rotation axis for the boom, an integral spring wire having an inner end mounted on said support hub member for rotation about the vertical axis and an outer end portion extending outwardly from the hub member in a substantially horizontal direction for rotation in a substantially horizontal plane, hose support means attached to the outer portion of the spring wire so as to support said supply hose outwardly of the support hub member for rotation with the spring wire about said vertical axis, said spring wire including at least one loop therein rotated through at least 360° arranged such that the wire can bend in a vertical bending plane down from the horizontal plane about an axis defined by the loop, said loop lying substantially in the vertical bending plane of the wire whereby bending of the wire in the vertical bending plane causes tortioning of the loop, the support hub member comprising a fixed hub portion mounted on a bracket for attachment to a fixed surface, a rotatable hub portion rotatable relative to the fixed hub portion on said bearing means, the rotatable hub portion including attachment means mounting said inner end of said spring wire thereof for rotation about the fixed hub portion through 360° surrounding the fixed hub portion, and means biasing the rotatable hub portion to a specific angular orientation thereof around the fixed hub portion to define a park position of the spring wire comprising a cam member mounted on said rotatable hub member and a cam follower, the follower being spring biased against the cam member and the cam member being shaped to define said park position while allowing rotation of said cam member relative to said cam follower through 360°.

20. The invention according to claim 19 wherein the cam member is heart-shaped.

21. A boom for a supply hose of a car wash comprising a support hub member including bearing means for defining a vertical rotation axis for the boom, an integral spring wire having an inner end mounted on said support hub member for rotation about the vertical axis and an outer end portion extending outwardly from the hub member in a substantially horizontal direction for rotation in a substantially horizontal plane, hose support means attached to the outer portion of the spring wire so as to support said supply hose outwardly of the support hub member for rotation with the spring wire about said vertical axis, said spring wire including at least one loop therein rotated through at least 360° arranged such that the wire can bend in a vertical bending plane down from the horizontal plane about an axis defined by the loop, said loop lying substantially in the vertical bending plane of the wire whereby bending of the wire in the vertical bending plane causes tortioning of the loop, wherein the hose support means includes an elongate pipe, the pipe having at an inlet end a first connector for receiving a cleaning liquid, a second connector for receiving compressed air, and wherein the interior of the pipe is substantially filled with an elongate material defining a multitude of interstices along the length of the material for generating foam from the liquid and air supply.

22. The invention according to claim 21 wherein the elongate material comprises a knitted plastic material.

* * * * *